United States Patent
Cho et al.

(10) Patent No.: US 10,688,922 B2
(45) Date of Patent: Jun. 23, 2020

(54) SOFT UPPER TRIM FOR SWITCH ASSEMBLY OF VEHICLE DOOR AND METHOD OF MANUFACTURING THE SAME

(71) Applicants: SEOYON E-HWA CO., LTD., Seoul (KR); SEOYON AMERICA CORPORATION, Auburn Hills, MI (US)

(72) Inventors: Ji Hyun Cho, Cheonan-si (KR); Dong Suk Kim, Asan-si (KR); Jong Kyu Kim, Cheonan-si (KR); Sung Won Lee, Seoul (KR)

(73) Assignees: SEOYON E-HWA CO., LTD., Seoul (KR); SEOYON AMERICA CORPORATION, Auburn Hills, MI (US)

(*) Notice: Subject to any disclaimer, the term of this patent is extended or adjusted under 35 U.S.C. 154(b) by 0 days.

(21) Appl. No.: 16/185,462

(22) Filed: Nov. 9, 2018

(65) Prior Publication Data

US 2019/0275931 A1    Sep. 12, 2019

(30) Foreign Application Priority Data

Mar. 9, 2018 (KR) .................. 10-2018-0027750
Mar. 9, 2018 (KR) .................. 10-2018-0027753

(51) Int. Cl.
*B60Q 3/217* (2017.01)
*F21V 8/00* (2006.01)
(Continued)

(52) U.S. Cl.
CPC .............. *B60Q 3/217* (2017.02); *B60Q 3/64* (2017.02); *B60R 13/0243* (2013.01);
(Continued)

(58) Field of Classification Search
CPC ...... B60Q 3/217; B60Q 3/64; B60Q 2500/10; G02B 6/0035; G02B 6/006; G02B 6/0065;
(Continued)

(56) References Cited

U.S. PATENT DOCUMENTS 6,371,548 B1 * 4/2002 Misaras ................. B60R 13/02
296/146.7
7,976,659 B2 * 7/2011 Dutouquet .......... B29C 33/0033
156/245

(Continued)

FOREIGN PATENT DOCUMENTS

EP    0622585    11/1994
EP    2085205    8/2009
(Continued)

OTHER PUBLICATIONS

German Office Action—German Application No. 1020181278942 dated Mar. 28, 2019, citing EP 2 085 205 and EP 0 622 585.

*Primary Examiner* — Anh T Mai
*Assistant Examiner* — Michael Chiang
(74) *Attorney, Agent, or Firm* — Cantor Colburn LLP (57) ABSTRACT

Provided is a soft upper trim of a vehicle door, in which an upper substrate, foam, and a transparent skin are laminated, and particularly, to a soft upper trim for switch assembly of a vehicle door, in which a switch, which is configured to preserve continuity of a transparent skin and display lock and unlock symbols on the transparent skin, is easily assembled to an upper substrate, and a method of manufacturing the same.

4 Claims, 5 Drawing Sheets

(51) Int. Cl.
  *B60Q 3/64* (2017.01)
  *H01H 9/16* (2006.01)
  *B60R 13/02* (2006.01)

(52) U.S. Cl.
  CPC .......... *G02B 6/006* (2013.01); *G02B 6/0035* (2013.01); *G02B 6/0065* (2013.01); *H01H 9/161* (2013.01); *B60Q 2500/10* (2013.01); *B60R 2013/0287* (2013.01); *H01H 2219/056* (2013.01); *H01H 2219/062* (2013.01); *H01H 2229/02* (2013.01); *H01H 2229/044* (2013.01); *H01H 2229/056* (2013.01)

(58) Field of Classification Search
  CPC ............ B60R 13/0243; B60R 13/0287; H01R 2219/056; H01R 2219/062; H01R 2219/02; H01R 2219/044
  See application file for complete search history.

(56) References Cited

U.S. PATENT DOCUMENTS

| | | | |
|---|---|---|---|
| 2002/0101738 A1* | 8/2002 | Misaras | B60K 37/06 362/487 |
| 2011/0157906 A1* | 6/2011 | Oeuvrard | B60R 13/02 362/488 |

FOREIGN PATENT DOCUMENTS

| | | |
|---|---|---|
| JP | 4218660 | 2/2009 |
| KR | 101087875 | 11/2011 |
| KR | 20170074740 | 6/2017 |

\* cited by examiner

Fig. 1

*Prior Art*

Fig. 2

*Prior Art*

Fig. 3

*Prior Art*

SOFT UPPER TRIM FOR SWITCH ASSEMBLY OF VEHICLE DOOR AND METHOD OF MANUFACTURING THE SAME

BACKGROUND

1. Technical Field

The present invention relates to a soft upper trim of a vehicle door, in which an upper substrate, foam, and a transparent skin are laminated, and particularly, to a soft upper trim for switch assembly of a vehicle door, in which a switch, which is configured to preserve continuity of a transparent skin and display lock and unlock symbols on the transparent skin, is easily assembled to an upper substrate, and a method of manufacturing the same.

2. Description of Related Art

A foamed skin trim 70 (see FIG. 1) at a door upper trim side for a vehicle is disclosed in the patent document (Korean Patent Registration No. 10-1087875).

That is, a substrate for a door trim of a vehicle is divided into an injection-molded upper substrate, a center substrate, and a lower substrate. The three divided substrates are connected through screws or the like.

Figure 1:
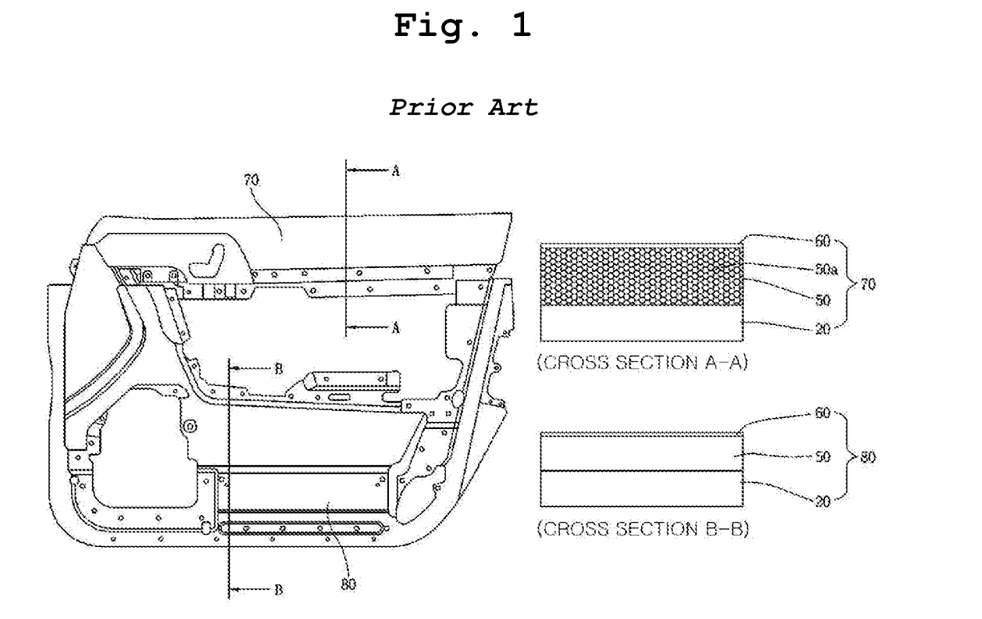
FIG. 1 illustrates a view of a conventional soft door trim for a vehicle and cross-sectional views of upper and lower trims thereof.

In addition, a foam-molded foam 50 and a transparent skin 60 are further laminated on the upper substrate 20 (see FIG. 1).

The foam 50 provides a cushioning sensation, and the transparent skin 60 provides a luxurious feeling, such as a leather feeling.

Figure 2:
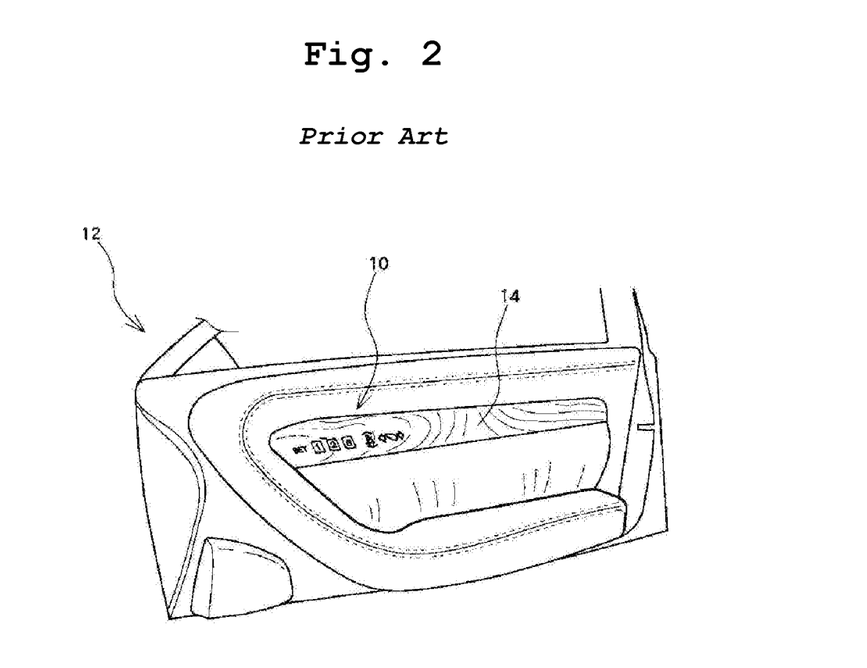
FIGS. 2 and 3 are diagrams illustrating an interior of a front seat door provided with a conventional switch device for a vehicle and illustrating states in which symbols of the switch device are displayed and not displayed.
Figure 3:
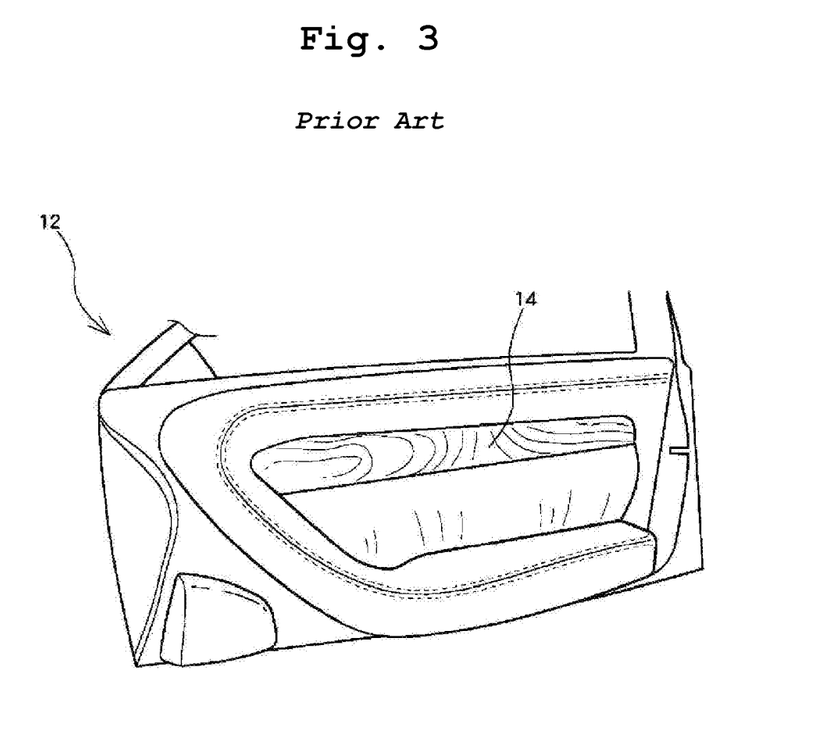

On the other hand, in the patent document (Japanese Patent Publication No. 4218660), as illustrated in FIGS. 2 and 3, when a driver puts a hand near a driving seat, operating symbols are displayed on a decorative panel 14, and the driver presses a desired operating symbol to operate.

That is, a switch device 10 configured to display a symbol is a hidden switch type which is embedded in a substrate of a door trim of a vehicle.

The hidden switch device 10 has a structure which is embedded only in a hard substrate. In particular, the hidden switch device 10 is embedded to be disposed between an upper portion and a lower portion of a lower trim.

Therefore, drivers who get out of the vehicle may not check a symbol inside the vehicle through a window.

In particular, after a door is locked or unlocked, when drivers get out of the vehicle, the drivers tend to check the symbol through the window, but such a demand may not be satisfied.

Above all, when the conventional switch device 10 is mounted on an upper trim, holes, into which the switch device 10 is inserted, should be formed in the transparent skin 60 and the foam 50, and after the switch is mounted, a finishing treatment should be performed with the transparent skin 60. However, the finishing treatment is postprocessed and thus may not attractive and likely to drop a price of the vehicle.

Due to the possibility of damage of the transparent skin 60, the conventional hidden switch device 10 has been embedded in a hard substrate as illustrated in FIGS. 2 and 3.

Meanwhile, in the patent document (Korean Patent Laid-Open Publication No. 10-2017-0074740), since a switch is provided on a substrate, the same problem arises similarly to the patent document (Japanese Patent Publication No. 4218660).

PRIOR-ART DOCUMENTS

Patent Documents (Patent Document 1) Korean Patent Registration No. 10-1087875

(Patent Document 2) Japanese Patent Publication No. 4218660

(Patent Document 3) Korean Patent Laid-Open Publication No. 10-2017-0074740

SUMMARY

1. Technical Problem

The present invention has been made to solve the above-mentioned problems, and a technical objective of the present invention is to provide a soft door trim for switch assembly of a vehicle, which is capable of displaying symbols on a transparent skin on an upper door trim thereof without damaging the transparent skin, and a method of manufacturing the same.

2. Solution to Problem

In order to achieve the above objects, a method of manufacturing a soft upper trim for switch assembly of a vehicle door according to an embodiment of the present invention is a method of manufacturing a soft upper trim for switch assembly of a vehicle door in which a molding layer and a transparent layer are formed in a state in which a light guide plate is assembled to an upper substrate, the method including: (a) injection-molding the upper substrate such that a recessed groove and a protrusion groove communicate with each other, wherein a switch module is inserted into the recessed groove in a lower side of the upper substrate and a light guide plate engraved with a symbol is inserted into the protrusion groove in an upper side of the upper substrate; (b) assembling the light guide plate in the protrusion groove, wherein the light guide plate has a thickness equal to a thickness of the protrusion groove; (c) foam-molding a foam on the upper substrate around the protrusion groove in a state in which the upper substrate assembled with the light guide plate is inserted, wherein the foam has a thickness equal to the thickness of each of the protrusion groove and the light guide plate; (d) applying an adhesive on upper surfaces of the protrusion groove, the light guide plate, and the foam; and (e) attaching a transparent skin on the upper surfaces of the protrusion groove, the light guide plate, and the foam in a vacuum membrane press.

A method of manufacturing a soft upper trim for switch assembly of a vehicle door according to an embodiment of the present invention is a method of manufacturing a soft upper trim for switch assembly of a vehicle door in which a molding layer and a transparent layer are formed in a state in which a light guide plate is assembled to an upper substrate, the method including: (a) injection-molding the upper substrate such that a recessed groove and a protrusion groove communicate with each other, wherein a switch module is inserted into the recessed groove in a lower side of the upper substrate and a light guide plate engraved with a symbol is inserted into the protrusion groove in an upper side of the upper substrate; (b) assembling the light guide plate in the protrusion groove, wherein the light guide plate has a thickness equal to a thickness of the protrusion groove; (c) foam-molding a foam on the upper substrate around the protrusion groove in a state in which the upper substrate assembled with the light guide plate is inserted, wherein the foam has a thickness equal to the thickness of each of the protrusion groove and the light guide plate; and (d) attaching a transparent skin on upper surfaces of the protrusion groove, the light guide plate, the foam in a vacuum membrane press, wherein the transparent skin has a lower surface applied with an adhesive.

A method of manufacturing a soft upper trim for switch assembly of a vehicle door according to an embodiment of the present invention is a method of manufacturing a soft upper trim for switch assembly of a vehicle door in which a molding layer and a transparent layer are formed in a state in which a light guide plate is assembled to an upper substrate, the method including: (a) injection-molding the upper substrate such that a lower recessed groove and an upper recessed groove communicate with each other, wherein a switch module is inserted into the lower recessed groove in a lower side of the upper substrate and a light guide plate engraved with a symbol is inserted into the upper recessed groove in an upper side of the upper substrate; (b) assembling the light guide plate in the upper recessed groove; (c) injection-molding a transparent resin on upper surfaces of the upper substrate and the light guide plate in a state in which the upper substrate assembled with the light guide plate is inserted; and (d) ejecting a transparent paint on an upper surface of the transparent paint.

According to an embodiment of the invention, in the assembling of the light guide plate, the light guide plate may be assembled such that the upper surface of the light guide plate is placed at a higher level than the upper surface of the upper substrate.

A soft upper trim for switch assembly of a vehicle door according to an embodiment of the present invention includes an upper substrate, a molding layer, and a transparent layer, which are laminated, wherein a through-hole, into which a switch module is inserted, is vertically formed in the upper substrate, a recessed groove, which has a diameter greater than a diameter of the through-hole, is formed in a lower side of the upper substrate, a partition, which has a protrusion groove with a diameter greater than a diameter of the through-hole, is formed to protrude from an upper side of the upper substrate, a light guide plate, which has a thickness equal to a thickness of the protrusion groove and a symbol engraved therein, is assembled in the protrusion groove, the molding layer includes a foam which is foam-molded around the partition so as to have a thickness equal to the thickness of each of the protrusion groove and the light guide plate, and the transparent layer is a transparent skin which is attached to upper surfaces of the protrusion groove, the light guide plate, and the foam.

According to an embodiment of the present invention, the light guide plate may include side plates and an upper plate which connects upper surfaces of the side plates and has the symbol engraved therein, wherein an accommodation groove, in which a upper side of the switch module is inserted and accommodated, is further formed inside a lower side of the light guide plate.

A soft upper trim for switch assembly of a vehicle door according to an embodiment of the present invention includes an upper substrate, a molding layer, and a transparent layer, which are laminated, wherein an upper recessed groove and a lower recessed groove are formed in the upper substrate so as to communicate with each other, wherein a switch module is inserted into the lower recessed groove, a light guide plate is assembled in the upper recessed groove and has a symbol engraved in an upper side thereof; the molding layer includes a transparent resin which is injection-molded on upper surfaces of the upper substrate and the light guide plate, and the transparent layer includes a transparent paint which is applied on an upper surface of the transparent resin.

According to an embodiment of the present invention, the transparent resin may include a thermoplastic elastomer (TPE) material, the transparent resin may include a urethane material, the upper substrate may include polypropylene (PP), and the light guide plate may include polycarbonate (PC).

According to an embodiment of the present invention, the light guide plate may include side plates and an upper plate, which connects upper surfaces of the side plates and has the symbol engraved therein, an accommodation groove, in which a upper side of the switch module is inserted and accommodated, may further be formed inside a lower side of the light guide plate, and an upper surface of the light guide plate may be placed at a higher level as an upper surface of the upper substrate.

3. Advantageous Effects

The present invention has the following effects.

Since foam and a transparent skin are laminated after a groove, in which a switch module is installed, is formed in a lower surface of an upper substrate, continuity of a conventional transparent skin is maintained to secure both of a hidden property of the switch module and smoothness of the transparent skin, thereby providing an excellent external appearance.

In particular, since symbols are displayed on an upper substrate at a specific position close to a window, it is possible to check the symbols in the inside of a vehicle as well as through the window from the outside of the vehicle. In particular, it is possible to check whether a door is properly locked (when symbols are formed on a center substrate or a lower substrate, it is difficult or impossible for a driver to check the symbols inside or outside the vehicle).

Since a protrusion groove, in which a light guide plate is assembled, is implemented by a partition, the protrusion groove functions to prevent foam from adhering to a light guide plate when the foam is foam-molded.

Since an accommodation groove, in which an upper side of a switch module is accommodated, is formed in a center of a lower surface of a light guide plate, a thickness of an upper plate of the light guide plate is reduced by a thickness of the accommodation groove to considerably improve transmittance so that the accommodation groove further improves clearness of symbols and functions to additionally fix the switch module.

On the other hand, since a transparent resin and a transparent paint are applied, a separate process of boring a hole in the transparent resin is not required, thereby simplifying a process.

In addition, since a transparent resin is implemented using a thermo plastic elastomer (TPE) material, an upper substrate is implemented using a polypropylene (PP) material, and a light guide plate is implemented using a polycarbonate (PC) material, the transparent resin has a very high affinity with the upper substrate and the light guide plate when being injection-molded.

Furthermore, since a transparent paint is implemented using a urethane material, the transparent paint has a high affinity with a thermo plastic elastomer (TPE) material.

In addition, since a light guide plate is assembled such that an upper surface is placed at a higher level than an upper surface of an upper substrate, the upper surface of the light guide plate protrudes from the upper substrate in the form of a stepped portion to greatly contribute to fixing of an injection-molded transparent resin.

(Description of Symbols)

| 100, 100': soft upper trim for switch assembly of a vehicle door | |
|---|---|
| 1: switch module | 3: switch |
| 5: bezel | 200, 200': upper substrate |
| 210: through-hole | 230: recessed groove |
| 240: protrusion groove | 250: partition |
| 300: light guide plate | 305: accommodation groove |
| 315: lock and unlock symbols | 400: foam |
| 500: transparent skin | 600: adhesive |
| 230': lower recessed groove | 240': upper recessed groove |
| 400': transparent resin | 500': transparent paint |

DETAILED DESCRIPTION OF EMBODIMENTS

Hereinafter, exemplary embodiments of the present invention will be described in detail with reference to the accompanying drawings. The same reference numerals will be given to the same parts as conventional parts, and detailed description thereof will be omitted.

Figure 4:
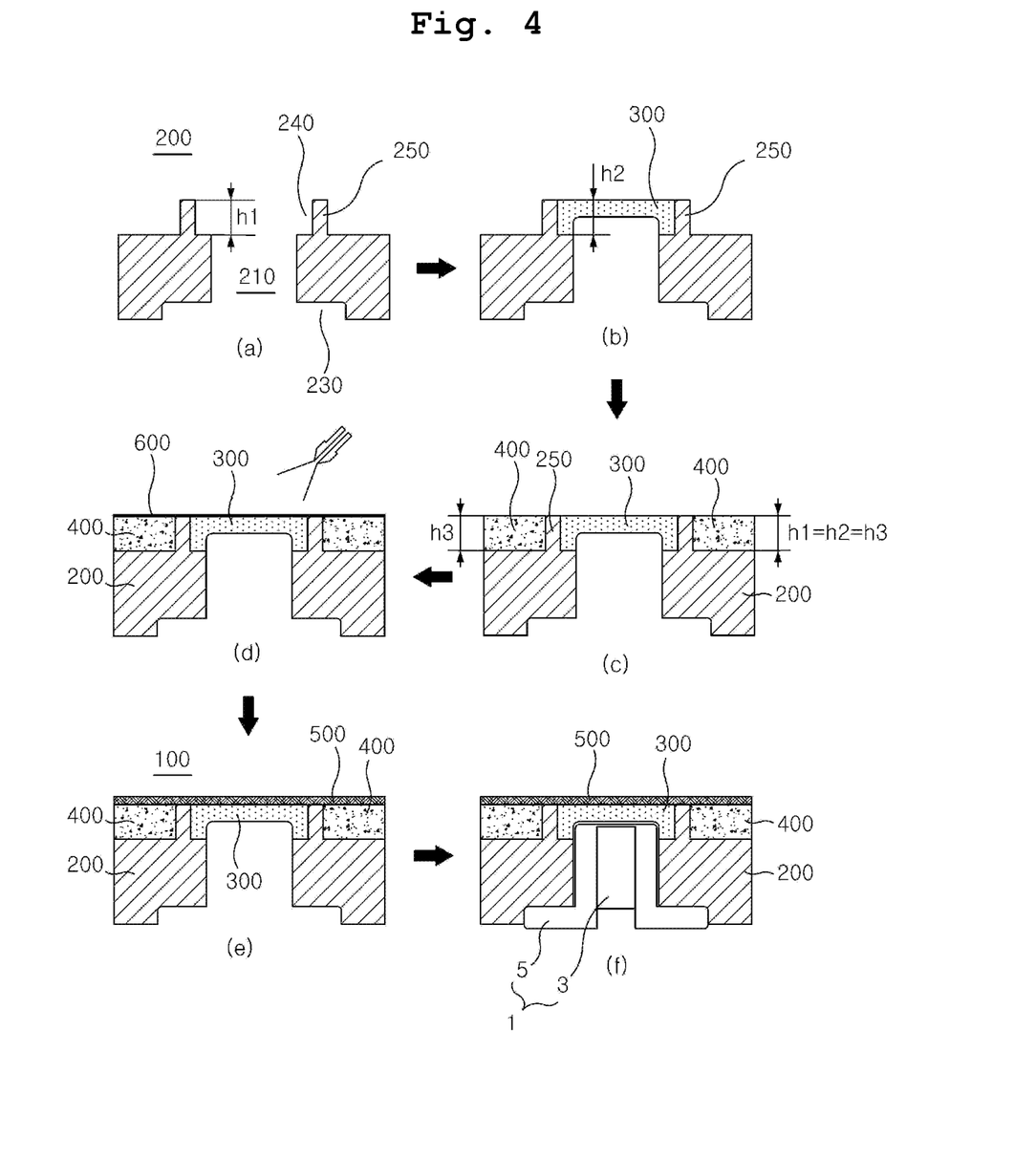
FIG. 4 is a set of sequence diagrams illustrating a method of manufacturing a soft upper trim for switch assembly for a vehicle door according to a first exemplary embodiment of the present invention.
Figure 5:
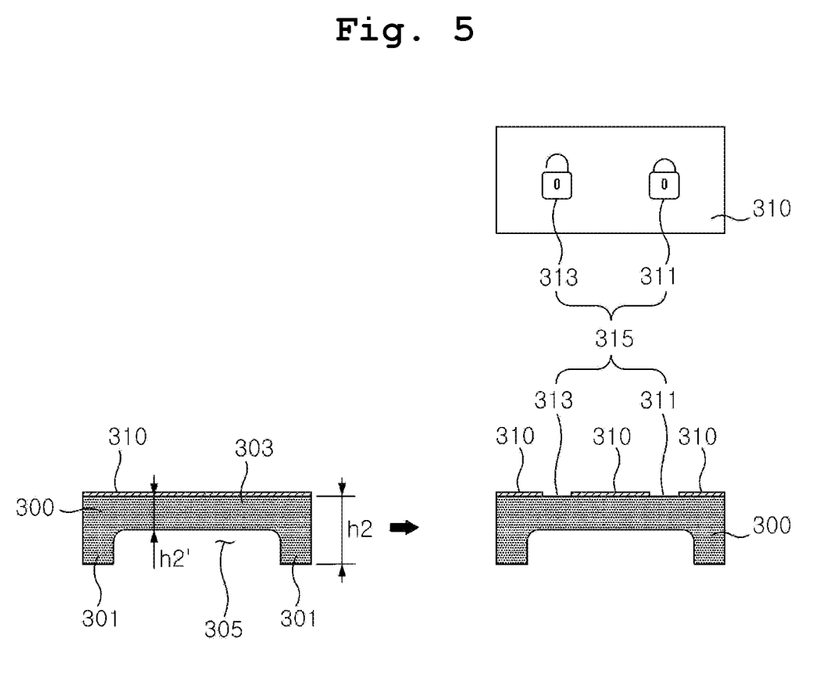
FIG. 5 is a set of sequence diagrams illustrating a process of engraving symbols in a light guide plate of FIG. 4.
Figure 6:
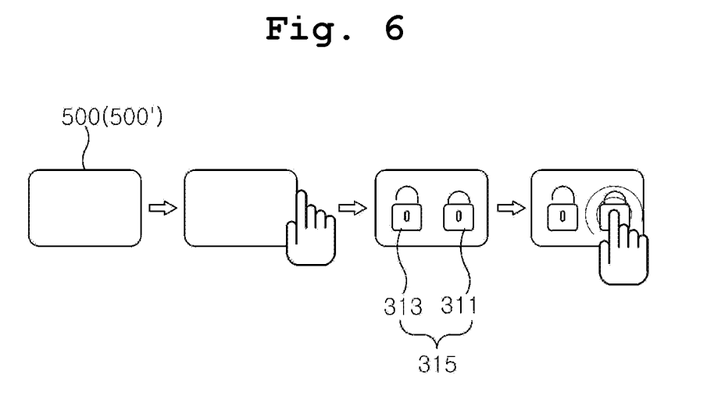
FIG. 6 is a set of operational sequence diagrams of a hidden switch.
Figure 7:
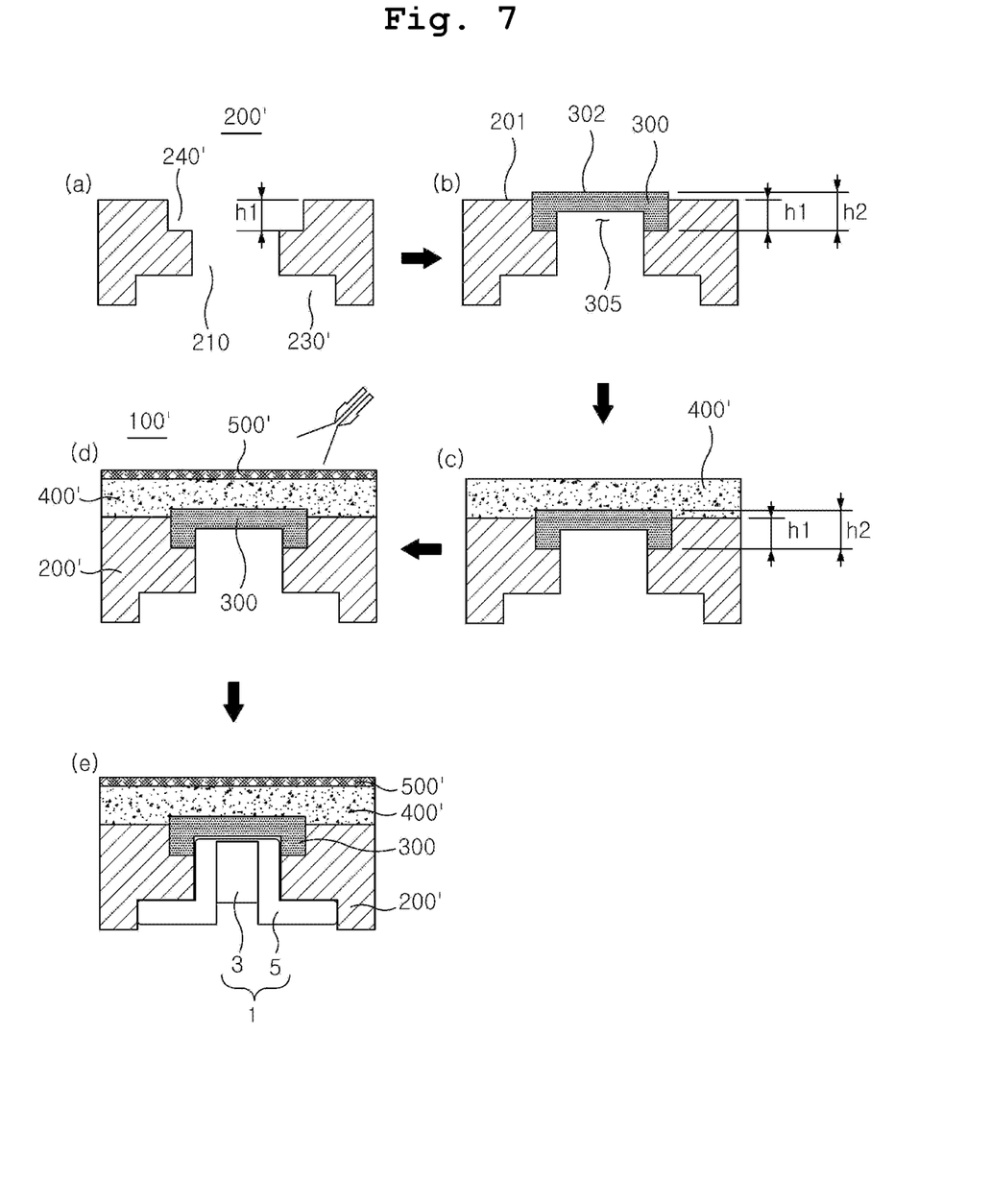
FIG. 7 is a set of sequence diagrams illustrating a method of manufacturing a soft upper trim for switch assembly for a vehicle door according to a second exemplary embodiment of the present invention.

FIG. 4 is a set of sequence diagrams illustrating a method of manufacturing a soft upper trim for switch assembly for a vehicle door according to a first exemplary embodiment of the present invention. FIG. 5 is a set of sequence diagrams illustrating a process of engraving symbols in a light guide plate of FIG. 4. FIG. 6 is a set of operational sequence diagrams of a hidden switch. FIG. 7 is a set of sequence diagrams illustrating a method of manufacturing a soft upper trim for switch assembly for a vehicle door according to a second exemplary embodiment of the present invention.

First Exemplary Embodiment

As illustrated in FIG. 4E, a soft upper trim 100 for switch assembly of a vehicle door according to the present first exemplary embodiment includes an upper substrate 200 to which a switch module 1 is assembled, a light guide plate 300 assembled to the upper substrate 200, and a foam 400, and a transparent skin 500 laminated on an upper surface of the upper substrate 200 around the light guide plate 300.

The upper substrate 200 is an injection-molded product made of an acrylonitrile butadiene styrene (ABS) material.

As illustrated in FIG. 4A, a through-hole 210 is formed in the upper substrate 200 along a vertical center line thereof. A recessed groove 230 having a diameter greater than a diameter of the through-hole 210 is formed in a lower side of the upper substrate 200 so as to communicate with the through-hole 210.

The through-hole 210 and the lower recessed groove 230 become a space in which the switch module 1 is caught and assembled as illustrated in FIG. 4F.

In addition, a partition 250, which has a protrusion groove 240 having a diameter greater than the diameter of the through-hole 210, is injection-molded to protrude from an upper side of the upper substrate 200.

The light guide plate 300 is assembled in the protrusion groove 240.

The light guide plate 300 may be a material affiliated to engineering plastic such as polycarbonate (PC) and may function to diffuse light of a light-emitting diode (LED) (not shown) of a switch device 3 in the switch module 1.

In addition, as illustrated in FIG. 5, after an opaque paint 310 is coated (masked) on an upper surface of the light guide plate 300, patterns corresponding to a lock symbol 311 and an unlock symbol 313 are formed by cutting and removing the opaque paint 310 using a laser. A film, on which symbols 315 are formed, may be attached instead of the masking.

Therefore, when light is emitted through the light guide plate 300, the light may pass through only the lock and unlock symbols 311 and 313. Accordingly, a driver may view the lock/unlock symbols 311 and 313.

As illustrated in FIG. 5, the light guide plate 300 includes side plates 301 and an upper plate 303 which connects upper surfaces of the side plates 301 and has the symbols 311 and 313 engraved therein. An accommodation groove 305, in which an upper side of the switch module 1 is inserted and accommodated, is further formed inside a lower side of the light guide plate 300.

Therefore, since a thickness h2' of the upper plate 303 is less than a thickness h2 of the side plate 301, light may be more clearly diffused and pass through the upper plate 303.

In addition, since the upper side of the switch module 1 is accommodated and assembled in the accommodation groove 305, the additional fixing of the switch module 1 is much better.

Since the switch module 1 is inserted until a bezel 5 of the switch module 1 is caught on the recessed groove 230, the light guide plate 300 is not excessively pressed upward.

On the other hand, as illustrated in FIG. 4B, the partition 250 is injection-molded to protrude such that a thickness h1 of the partition 250 is equal to a thickness h2 of the light guide plate 300.

The partition 250 serves as a blocking wall configured to block the foam 400, to be described below, from flowing to the light guide plate 300 when the foam 400 is foam-molded.

As illustrated in FIG. 4C, the foam 400 is foam-molded on the upper substrate 200 around the partition 250.

The foam 400 is foamed such that a thickness h3 of the foam 400 is equal to the height h2 of the light guide plate 300 (h1=h2=h3).

When the foam 400, the partition 250, and the light guide plate 300 are formed to have the same height, a flat surface having no stepped portion is formed to prevent the transparent skin 500 from being wrinkled or uneven due to a stepped portion when the transparent skin 500 is attached.

The foam 400 commonly has a thickness of about 2 to 5 mm.

The foam 400 may be a polyurethane (PU) foam.

Since the foam 400 is non-transparent, the foam 400 is foam-molded on the upper surface of the upper substrate 200 excluding a location of the light guide plate 300.

As illustrated in FIG. 4E, the transparent skin 500 is attached to upper surfaces of the foam 400, the partition 250, and the light guide plate 300.

The transparent skin 500 may be a textured sheet and may be a thermoplastic olefin (TPO) or polyvinyl chloride (PVC) fabric or the like having a thickness of 0.5 to 1.0 mm or a thickness of 1.0 mm or more and a transmittance of about 10% to 15%.

The TPO fabric is a material which is widely used as an interior material of a vehicle.

The switch module 1 includes a switch device 3 which includes lock and unlock-corresponding LEDs, a printed circuit board (PCB), and the like, and a bezel 5 on which the switch device 3 is mounted.

A method of manufacturing the above-described soft upper trim 100 for switch assembly of a vehicle door will be described with reference to FIG. 4.

As illustrated in FIG. 4A, an upper substrate 200 is injection-molded such that a recessed groove 230 and a protrusion groove 240 communicate with each other, wherein a switch module 1 is inserted into the recessed groove 230 in a lower side of the upper substrate 200 and a light guide plate 300 engraved with symbols 315 is inserted into the protrusion groove 240 in an upper side of the upper substrate 200.

As illustrated in FIG. 4B, the light guide plate 300 having a height equal to a height of the protrusion groove 240 is inserted and assembled in the protrusion groove 240 of the injection-molded upper substrate 200.

In a state in which the upper substrate 200, in which the light guide plate 300 is assembled in the protrusion groove 240, is inserted, as illustrated in FIG. 4C, a foam 400, which has a thickness equal to the thickness of each of the protrusion groove 240 and the light guide plate 300, is foam-molded around a partition 250 having the protrusion groove 240.

As illustrated in FIG. 4D, an adhesive 600 is applied to upper surfaces of the partition 250, the light guide plate 300, and the foam 400, which have the same thickness.

As illustrated in FIG. 4E, a transparent skin 500 is attached to the upper surfaces of the partition 250, the light guide plate 300, and the foam 400, on which the adhesive 600 is applied.

The transparent skin 500 is attached in a membrane vacuum press.

The membrane vacuum press has a silicone film at an upper portion thereof instead of a separate mold. When a peripheral portion of the membrane vacuum press is sealed after the membrane vacuum press is assembled, while a vacuum table at a lower portion of the membrane vacuum press vacuum-suctions and laminates a transparent skin, the silicon film functions to press the transparent skin once more.

As illustrated in FIG. 4F, the switch module 1 is assembled to the soft upper trim 100 for switch assembly of a vehicle door as manufactured above.

The soft upper trim assembled with the switch module 1 is coupled to a center trim and a lower trim and is assembled and used as a final interior material of a vehicle door.

Accordingly, as illustrated in FIG. 6, when a driver's hand approaches within 15 mm of the transparent skin 500 at a position where the hidden switch module 1 is assembled, a proximity sensor senses the hand and irradiates light of the LED to display only the lock and unlock symbols 315 on the transparent skin 500.

When a desired symbol is touched among the displayed lock/unlock symbols 315, light of an undesired symbol is turned off, and the desired symbol is turned off after a few seconds, operation of the switch module 1 is ended.

To turn off the symbols 315, a light irradiation time of the LED may be set.

On the other hand, instead of ejecting and applying the adhesive 600 of FIG. 4D on the upper surfaces of the protrusion groove 240, the light guide plate 300, and the foam 400, the transparent skin 500 having a lower surface applied with an adhesive, such as a hot melt adhesive, may be placed and pressed on the upper surfaces of the protrusion groove 240, the light guide plate 300, and the foam 400.

In addition, although it has been described that the symbols 315 are lock/unlock patterns, the symbols 315 also include an operation symbol for performing functions inside a vehicle or an illumination symbol on which a lighting pattern for LED mood lighting is formed.

Second Exemplary Embodiment

As illustrated in FIG. 7, a soft upper trim 100' for switch assembly of a vehicle door according to the present second exemplary embodiment includes an upper substrate 200' to which a switch module 1 is assembled, a light guide plate 300 assembled to the upper substrate 200', a transparent resin 400' injection-molded on upper surfaces of the light guide plate 300 and the upper substrate 200, and a transparent paint 500' applied on an upper surface of the transparent resin 400'.

The upper substrate 200' is a component injection-molded using polypropylene (PP).

As illustrated in FIG. 7A, a through-hole 210 is formed along a vertical center line of the upper substrate 200'. A lower recessed groove 230 having a diameter greater than a diameter of the through-hole 210 is formed in a lower side of the upper substrate 200' so as to communicate with the through-hole 210.

In addition, an upper recessed groove 240' having a diameter greater than the diameter of the through-hole 240 is formed in an upper side of the upper substrate 200'. As illustrated in FIG. 7B, the light guide plate 300 is assembled in the upper recessed groove 240'.

The structure and function of the light guide plate 300 of the second exemplary embodiment are similar to those of the light guide plate 300 of the first exemplary embodiment. However, as illustrated in FIG. 7B, the light guide plate 300 having a thickness h2 greater than a thickness h1 of the upper recessed groove 240' may be assembled, i.e., an upper surface 302 of the light guide plate 300 may protrude further compared to an upper surface 201 of the upper substrate 200'.

An upper side of the light guide plate 300, which is assembled to protrude, functions as a latch stepped portion to completely prevent a phenomenon in which the transparent resin 400' is caught, slippery, and peels off after being injection-molded.

As illustrated in FIG. 7C, the transparent resin 400' is injection-molded on the upper surfaces 201 of the upper substrate 200' and the upper substrate 302 of the light guide plate 300.

The transparent resin 400' may be implemented using a thermoplastic elastomer (TPE) material which has a thickness of about 1.0 to 2.5 mm and a transmittance of 64%.

In addition, the TPE material has a high affinity with polypropylene (PP) and polycarbonate (PC) materials.

Since the transparent resin 400' covers the entire upper surface 201 of the upper substrate 200' and the entire upper surface 302 of the light guide plate 300 as described above, even when the transparent paint 500' paint is applied, the transparent paint 500' may be prevented from being wrinkled or uneven due to a stepped portion.

After the transparent resin 400' is injection-molded, as illustrated in FIG. 7D, the transparent paint 500' is applied on the upper surface of the transparent resin 400'.

The transparent paint 500' has a transmittance of about 5% after light passes through the transparent resin 400'.

The transparent paint 500' maybe a urethane paint which has transmittance and a cushioning property.

A method of manufacturing the above-described soft upper trim 100' for switch assembly of a vehicle door will be described with reference to FIG. 7.

As illustrated in FIG. 7A, an upper substrate 200' is injection-molded such that a lower recessed groove 230 and an upper recessed groove 240' communicate with each other, wherein a switch module 1 is inserted into the lower recessed groove 230 in a lower side of the upper substrate 200 and a light guide plate 300 engraved with symbols 315 is inserted into the upper recessed groove 240 in an upper side of the upper substrate 200.

As illustrated in FIG. 7B, the light guide plate 300 is inserted and assembled in the upper recessed groove 240' of the injection-molded upper substrate 200'.

In this case, the light guide plate 300 is assembled such that an upper surface 302 of the light guide plate 300 is placed at a higher level than an upper surface 201 of the upper substrate 200'.

In a state in which the upper substrate 200', in which the light guide plate 300 is assembled in the upper recessed groove 240', is inserted as illustrated in FIG. 7C, a transparent resin 400' is injection-molded on upper surfaces of the upper substrate 200' and the light guide plate 300.

After the transparent resin 400' is injection-molded, as illustrated in FIG. 7D, a transparent paint 500' is ejected and applied on an upper surface of the transparent resin 400'.

As illustrated in FIG. 7E, the switch module 1 is assembled to the soft upper trim 100' for switch assembly of a vehicle door as manufactured above.

While the exemplary embodiments of the present invention are susceptible to various modifications and alternative forms, specific exemplary embodiments thereof are shown byway of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

The invention claimed is:

1. A method of manufacturing a soft upper trim for switch assembly of a vehicle door in which a molding layer and a transparent layer are formed in a state in which a light guide plate is assembled to an upper substrate, the method comprising:
   (a) injection-molding the upper substrate such that a recessed groove and a protrusion groove communicate with each other, wherein a switch module is inserted into the recessed groove in a lower side of the upper substrate and a light guide plate engraved with a symbol is inserted into the protrusion groove in an upper side of the upper substrate;
   (b) assembling the light guide plate in the protrusion groove, wherein the light guide plate has a thickness equal to a thickness of the protrusion groove;
   (c) foam-molding a foam on the upper substrate around the protrusion groove in a state in which the upper substrate assembled with the light guide plate is inserted, wherein the foam has a thickness equal to the thickness of each of the protrusion groove and the light guide plate;
   (d) applying an adhesive on upper surfaces of the protrusion groove, the light guide plate, and the foam; and
   (e) attaching a transparent skin on the upper surfaces of the protrusion groove, the light guide plate, and the foam in a vacuum membrane press.

2. A method of manufacturing a soft upper trim for switch assembly of a vehicle door in which a molding layer and a transparent layer are formed in a state in which a light guide plate is assembled to an upper substrate, the method comprising:
   (a) injection-molding the upper substrate such that a recessed groove and a protrusion groove communicate with each other, wherein a switch module is inserted into the recessed groove in a lower side of the upper substrate and a light guide plate engraved with a symbol is inserted into the protrusion groove in an upper side of the upper substrate;
   (b) assembling the light guide plate in the protrusion groove, wherein the light guide plate has a thickness equal to a thickness of the protrusion groove;
   (c) foam-molding a foam on the upper substrate around the protrusion groove in a state in which the upper substrate assembled with the light guide plate is inserted, wherein the foam has a thickness equal to the thickness of each of the protrusion groove and the light guide plate; and
   (d) attaching a transparent skin on upper surfaces of the protrusion groove, the light guide plate, the foam in a vacuum membrane press, wherein the transparent skin has a lower surface applied with an adhesive.

3. A soft upper trim for switch assembly of a vehicle door, the soft upper trim comprising an upper substrate, a molding layer, and a transparent layer, which are laminated, wherein:
   a through-hole, into which a switch module is inserted, is vertically formed in the upper substrate;
   a recessed groove, which has a diameter greater than a diameter of the through-hole, is formed in a lower side of the upper substrate;
   a partition, which has a protrusion groove with a diameter greater than a diameter of the through-hole, is formed to protrude from an upper side of the upper substrate;
   a light guide plate, which has a thickness equal to a thickness of the protrusion groove and a symbol engraved therein, is assembled in the protrusion groove;
   the molding layer includes a foam which is foam-molded around the partition so as to have a thickness equal to the thickness of each of the protrusion groove and the light guide plate; and
   the transparent layer is a transparent skin which is attached to upper surfaces of the protrusion groove, the light guide plate, and the foam.

4. The soft upper trim according to claim 3, wherein the light guide plate includes side plates and an upper plate which connects upper surfaces of the side plates and has the symbol engraved therein, wherein an accommodation groove, in which a upper side of the switch module is inserted and accommodated, is further formed inside a lower side of the light guide plate.

* * * * *